United States Patent
Bhide et al.

(10) Patent No.: US 11,809,373 B2
(45) Date of Patent: Nov. 7, 2023

(54) DEFINING REDUNDANT ARRAY OF INDEPENDENT DISKS LEVEL FOR MACHINE LEARNING TRAINING DATA

(71) Applicant: International Business Machines Corporation, Armonk, NY (US)

(72) Inventors: Manish Anand Bhide, Hyderabad (IN); Seema Nagar, Bangalore (IN); Prateek Goyal, Indore (IN); Kuntal Dey, Rampurhat (IN)

(73) Assignee: International Business Machines Corporation, Armonk, NY (US)

( * ) Notice: Subject to any disclaimer, the term of this patent is extended or adjusted under 35 U.S.C. 154(b) by 6 days.

(21) Appl. No.: 17/202,559

(22) Filed: Mar. 16, 2021

(65) Prior Publication Data

US 2022/0300453 A1  Sep. 22, 2022

(51) Int. Cl.
| | |
|---|---|
| *G06F 17/00* | (2019.01) |
| *G06F 16/16* | (2019.01) |
| *G06N 5/04* | (2023.01) |
| *G06N 20/00* | (2019.01) |

(52) U.S. Cl.
CPC .............. *G06F 16/16* (2019.01); *G06N 5/04* (2013.01); *G06N 20/00* (2019.01)

(58) Field of Classification Search
CPC ...... G06F 16/16; G06F 16/17; G06F 16/1724; G06F 16/1727; G06F 16/1752; G06F 3/0604; G06F 3/064; G06F 3/0608; G06F 3/0689; G06F 3/0605; G06F 3/0632; G06F 3/0653; G06F 3/067; G06N 5/04; G06N 20/00; G06N 7/01
See application file for complete search history.

(56) References Cited

U.S. PATENT DOCUMENTS

| | | | |
|---|---|---|---|
| 6,038,570 A * | 3/2000 | Hitz | G06F 3/0613 |
| 9,032,146 B2 | 5/2015 | Nolterieke | |
| 11,249,692 B2 * | 2/2022 | Martin | G06F 3/0614 |
| 2002/0184442 A1 | 12/2002 | Veitch | |
| 2018/0357018 A1 | 12/2018 | Karr | |
| 2019/0079898 A1 | 3/2019 | Xiong | |
| 2019/0149554 A1 | 5/2019 | Rueger | |

(Continued)

FOREIGN PATENT DOCUMENTS

WO    2018231350 A1    12/2018

OTHER PUBLICATIONS

Lei Han et al. Optimizing RAID/SSD controllers with lifetime extension for flash-based SSD array. Proceedings of the 19th ACM SIGPLAN/SIGBED International Conference on Languages, Compilers, and Tools for Embedded Systems, Association for Computing Machinery, 44-54, Jun. 2018.*

(Continued)

*Primary Examiner* — Greta L Robinson
(74) *Attorney, Agent, or Firm* — Randy Tejeda

(57) ABSTRACT

One or more computer processors determine a storage strategy for each chunked data block in a training dataset based on a respective computed usefulness score and a series of usefulness thresholds, wherein the storage strategy comprises RAID strategies that include striping, mirroring, parity, and double parity. The one or more computer processors distribute each data block in the training dataset according to the respective determined storage strategy.

14 Claims, 5 Drawing Sheets

(56) References Cited

U.S. PATENT DOCUMENTS

2019/0265890 A1    8/2019    Barajas Gonzalez
2019/0377610 A1*  12/2019  Gupta ................... G06N 20/00
2020/0233612 A1*   7/2020  Dalmatov ............. G06F 3/0631

OTHER PUBLICATIONS

"12Gb/s MegaRAID® Tri-Mode Software User Guide", Broadcom, Version 1.4, Feb. 16, 2018, 280 pages, <https://docs.broadcom.com/doc/MR-TM-SW-UG105>.

"AWS Data Exchange", © 2021, Amazon Web Services, Inc., 11 pages, <https://aws.amazon.com/data-exchange/>.

"RAID", © 1997-2021, 42 pages, <https://www.prepressure.com/library/technology/raid#raid-10>.

Anderson et al., "Selecting RAID levels for disk arrays", Conference on File and Storage Technologies (FAST'02), pp. 189-201, Jan. 28-30, 2002, Monterey, CA. (USENIX, Berkeley, CA ), 14 pages, <https://www.usenix.org/legacy/publications/library/proceedings/fast02/full_papers/andersonRAID/andersonRAID.pdf>.

Chilimbi et al., "Project Adam: Building an Efficient and Scalable Deep Learning Training System", This paper is included in the Proceedings of the 11th USENIX Symposium on Operating Systems Design and Implementation. Oct. 6-8, 2014 • Broomfield, CO978-1-931971-16-4, 13 pages, <https://www.usenix.org/system/files/conference/osdi14/osdi14-paper-chilimbi.pdf>.

Disclosed Anonymously, "Finding Optimized RAID Level for Streaming Data based on its Value in a Hybrid/Multi Cloud", An IP.com Prior Art Database Technical Disclosure, IP.com No. IPCOM000262164D, IP.com Electronic Publication Date: May 7, 2020, <https://priorart.ip.com/IPCOM/000262164>, (5 pages).

Zhang et al., "Self-Learning Disk Scheduling", IEEE Transactions On Knowledge and Data Engineering, vol. 21, No. 1, Jan. 2009, 16 pages, <https://ieeexplore.ieee.org/stamp/stamp.jsp?tp=&arnumber=4547426>.

* cited by examiner

DEFINING REDUNDANT ARRAY OF INDEPENDENT DISKS LEVEL FOR MACHINE LEARNING TRAINING DATA

BACKGROUND

The present invention relates generally to the field of machine learning, and more particularly to defining redundant array of independent disks level for machine learning training data.

RAID (Redundant Array of Inexpensive Disks or Redundant Array of Independent Disks) is a data storage virtualization technology that combines multiple physical disk drive components into one or more logical units for the purposes of data redundancy, performance improvement, or both. This was in contrast to the previous concept of highly reliable mainframe disk drives referred to as single large expensive disk. Data is distributed across the drives in one of several ways, referred to as RAID levels, depending on the required level of redundancy and performance. The different schemes, or data distribution layouts, are named by the word "RAID" followed by a number, for example RAID 0 or RAID 1. Each scheme, or RAID level, provides a different balance among the key goals: reliability, availability, performance, and capacity. RAID levels greater than RAID 0 provide protection against unrecoverable sector read errors, as well as against failures of whole physical drives.

SUMMARY

Embodiments of the present invention disclose a computer-implemented method, a computer program product, and a system. The computer-implemented method includes one or more computer processers determining a storage strategy for each chunked data block in a training dataset based on a respective computed usefulness score and a series of usefulness thresholds, wherein the storage strategy comprises RAID strategies that include striping, mirroring, parity, and double parity. The one or more computer processors distribute each data block in the training dataset according to the respective determined storage strategy.

DETAILED DESCRIPTION

Rapid development of machine learning models is a critical aspect of many industries, but a significant constraint of rapid model development is limited accessible to reliable training datasets and data points. The efficient creation of cognitive solutions requires allowing machine learning pipelines automated, redundant, and efficient access to training data. The internal architecture of the models combined with data are the main two elements and drivers of model and application performance. Increased speed in developing accurate machine learning models utilizing large amounts of training data has demonstrated a clear advantage in several industrial sectors but performance and model accuracy issues arise when training data is not stored on a storage medium capable of efficiently storing and efficiently delivering training data. Further, said issues may cause significant delays in the training and testing of machine learning models, subsequently delaying deployment and application of the models. Current solutions apply storage determination to entire training datasets resulting in wastage of capacity, performance, and data availability.

Embodiments of the present invention improve machine learning through a computed storage strategy (i.e., RAID) for each data block comprised in a training dataset, where strategy type is computed based on a usefulness score calculated for each data block, ensuring redundancy, fault tolerance, and performance. Embodiments of the present invention contain storage strategies that include, but are not limited to, striping, mirroring, parity, and double parity. Embodiments of the present invention recognize that dynamically determining and distributing training data based on one or more computed storage strategies significantly enhances machine learning pipeline performance and efficiency, while reducing data costs and wastage. Embodiments of the present invention improve machine learning model training through computing usefulness associated with a data block based on respective calculated information gain and calculated heterogeneity of the data distribution in said data block. Some embodiments of the present invention recognize that all data blocks or data records in a training dataset are not equally useful (i.e., information gain and heterogeneity), thus optimization of data blocks based on computed storage strategies improves subsequent model training and application. Implementation of embodiments of the invention may take a variety of forms, and exemplary implementation details are discussed subsequently with reference to the Figures.

The present invention will now be described in detail with reference to the Figures.

Figure 1:
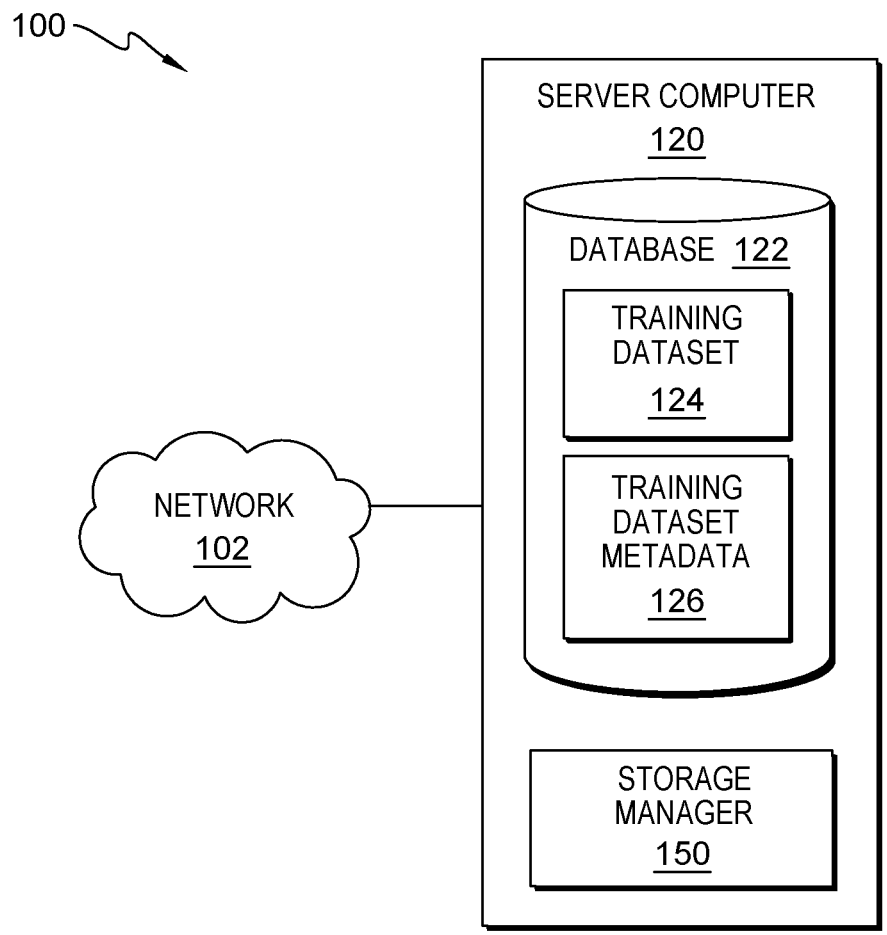
FIG. 1 is a functional block diagram illustrating a computational environment, in accordance with an embodiment of the present invention.

FIG. 1 is a functional block diagram illustrating a computational environment, generally designated 100, in accordance with one embodiment of the present invention. The term "computational" as used in this specification describes a computer system that includes multiple, physically, distinct devices that operate together as a single computer system. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

Computational environment 100 includes server computer 120 connected over network 102. Network 102 can be, for example, a telecommunications network, a local area network (LAN), a wide area network (WAN), such as the Internet, or a combination of the three, and can include wired, wireless, or fiber optic connections. Network 102 can include one or more wired and/or wireless networks that are capable of receiving and transmitting data, voice, and/or video signals, including multimedia signals that include voice, data, and video information. In general, network 102 can be any combination of connections and protocols that will support communications between server computer 120, and other computing devices (not shown) within computational environment 100. In various embodiments, network 102 operates locally via wired, wireless, or optical connections and can be any combination of connections and protocols (e.g., personal area network (PAN), near field communication (NFC), laser, infrared, ultrasonic, etc.).

Server computer 120 can be a standalone computing device, a management server, a web server, a mobile computing device, or any other electronic device or computing system capable of receiving, sending, and processing data. In other embodiments, server computer 120 can represent a server computing system utilizing multiple computers as a server system, such as in a cloud computing environment. In another embodiment, server computer 120 can be a laptop computer, a tablet computer, a netbook computer, a personal computer (PC), a desktop computer, a personal digital assistant (PDA), a smart phone, or any programmable electronic device capable of communicating with other computing devices (not shown) within computational environment 100 via network 102. In another embodiment, server computer 120 represents a computing system utilizing clustered computers and components (e.g., database server computers, application server computers, etc.) that act as a single pool of seamless resources when accessed within computational environment 100. In the depicted embodiment, server computer 120 includes database 122 and storage manager 150. In other embodiments, server computer 120 may contain other applications, databases, programs, etc. which have not been depicted in computational environment 100. Server computer 120 may include internal and external hardware components, as depicted and described in further detail with respect to FIG. 5.

Database 122 is a repository for data used by storage manager 150. In the depicted embodiment, database 122 resides on server computer 120. In another embodiment, database 122 may reside elsewhere within computational environment 100 provided storage manager 150 has access to database 122. A database is an organized collection of data. Database 122 can be implemented with any type of storage device capable of storing data and configuration files that can be accessed and utilized by storage manager 150, such as a database server, a hard disk drive, or a flash memory. In an embodiment, database 122 stores data used by storage manager 150, such as historical storage determinations. In an embodiment, database 122 contains training dataset 124 and training dataset metadata 126.

Training dataset 124 contains one or more data blocks, training sets, data structures, and/or variables used to fit the parameters of a specified model. The contained data blocks each comprise data records (i.e., training statements). In an embodiment, data records include an input vector with an associated output vector. In another embodiment, data records are instances of classified (e.g., labelled) data. In another embodiment, each data block contains an array of data records organized in labelled sets or pairs. For example, a data block includes "positive" and "negative" labels paired with associated data records (e.g., words, sentences, etc.). In an embodiment, each data block includes a class and an associated array or set of data records which can be utilized to train one or more models.

Training dataset metadata 126 include data regarding the data blocks within training dataset 124. In an embodiment, training dataset metadata 126 includes the name and version of the dataset, data pointers, column names and types, column importance values, row importance values, and data block statistics, such as distributions of the input and target columns. In another embodiment, training dataset metadata 126 includes associated model information such as model type (e.g., random forest, neural network etc.), feature preprocessing methods, hyperparameters, model metrics (e.g., area under the ROC curve (AUROC), k-fold cross validation, etc.). In a further embodiment, training dataset metadata 126 includes system information, such as source code, programming language and versions, dependencies, and host information (e.g., environment variables, system packages, system specifications (e.g., central processing unit specification, etc.)).

Storage manager 150 is a program for defining redundant array of independent disks level for machine learning training data. In various embodiments, storage manager 150 may implement the following steps: determine a storage strategy for each chunked data block in a training dataset based on a respective computed usefulness score and a series of usefulness thresholds, wherein the storage strategy comprises RAID strategies that include striping, mirroring, parity, and double parity. The one or more computer processors distribute each data block in the training dataset according to the respective determined storage strategy. In the depicted embodiment, storage manager 150 is a standalone software program. In another embodiment, the functionality of storage manager 150, or any combination programs thereof, may be integrated into a single software program. In some embodiments, storage manager 150 may be located on separate computing devices (not depicted) but can still communicate over network 102. In various embodiments, client versions of storage manager 150 resides on any other computing device (not depicted) within computational environment 100. Storage manager 150 is depicted and described in further detail with respect to FIG. 2.

The present invention may contain various accessible data sources, such as database 122, training dataset 124, and training dataset metadata 126 that may include personal storage devices, data, content, or information the user wishes not to be processed. Processing refers to any, automated or unautomated, operation or set of operations such as collection, recording, organization, structuring, storage, adaptation, alteration, retrieval, consultation, use, disclosure by transmission, dissemination, or otherwise making available, combination, restriction, erasure, or destruction performed on personal data. Storage manager 150 provides informed consent, with notice of the collection of personal data, allowing the user to opt in or opt out of processing personal data. Consent can take several forms. Opt-in consent can impose on the user to take an affirmative action before the personal data is processed. Alternatively, opt-out consent can impose on the user to take an affirmative action to prevent the processing of personal data before the data is processed. Storage manager 150 enables the authorized and secure processing of user information, such as tracking information, as well as personal data, such as personally identifying information or sensitive personal information. Storage manager 150 provides information regarding the personal data and the nature (e.g., type, scope, purpose, duration, etc.) of the processing. Storage manager 150 provides the user with copies of stored personal data. Storage manager 150 allows the correction or completion of incorrect or incomplete personal data. Storage manager 150 allows the immediate deletion of personal data.

Figure 2:
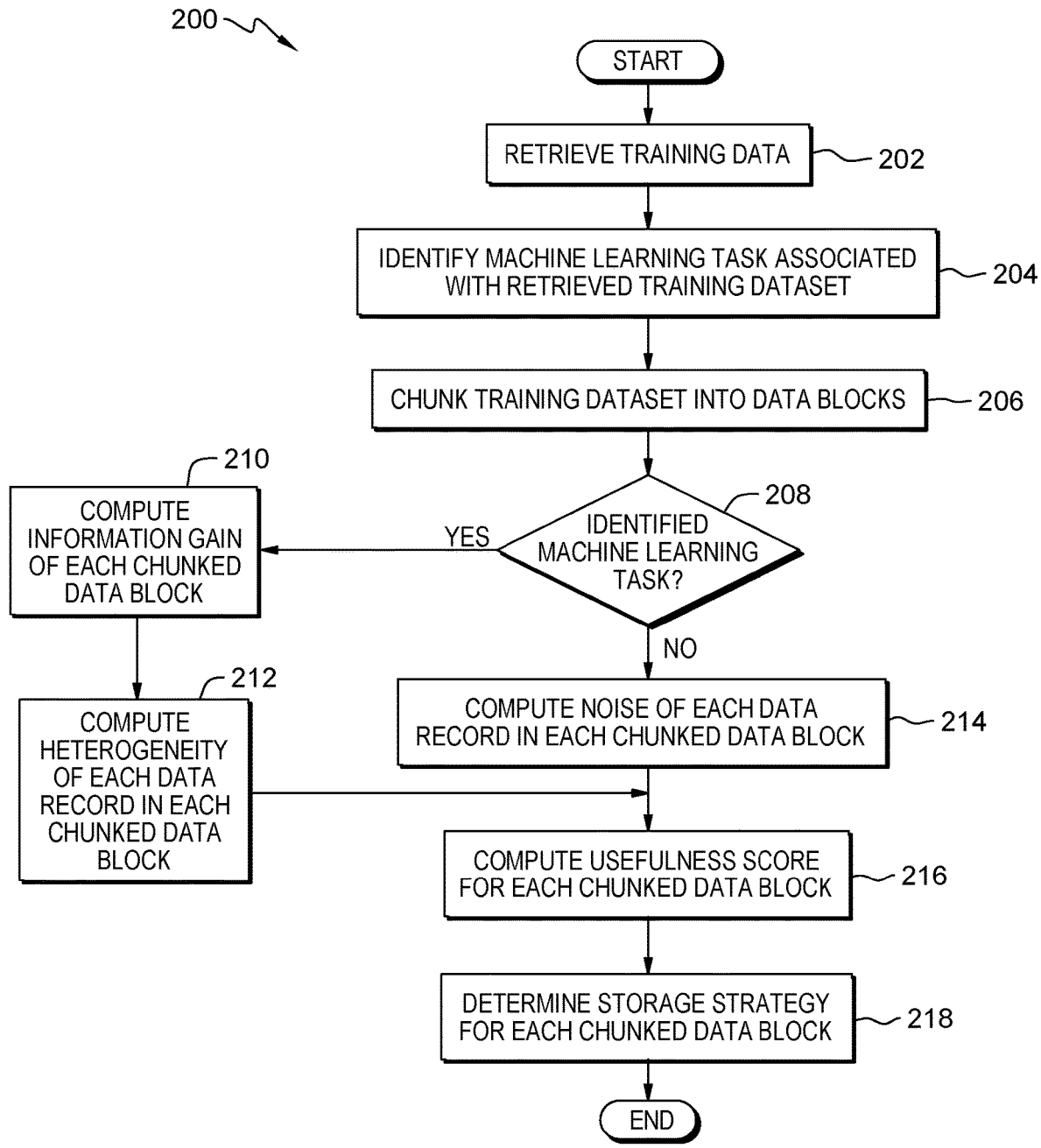
FIG. 2 is a flowchart depicting operational steps of a program, on a server computer within the computational environment of FIG. 1, for defining redundant array of independent disks level for machine learning training data, in accordance with an embodiment of the present invention.

FIG. 2 depicts flowchart 200 illustrating operational steps of storage manager 150 for defining redundant array of independent disks level for machine learning training data, in accordance with an embodiment of the present invention.

Storage manager 150 retrieves training dataset (step 202). Storage manager 150 retrieves training dataset 124. In an embodiment, storage manager 150 initiates responsive to a user commencement of a machine learning pipeline. In another embodiment, storage manager 150 commences responsive to a detected or newly received training dataset, set of data blocks, or one or more data records. In an embodiment, storage manager 150 continuously initiates machine learning pipelines in response to continuously streaming data blocks or data records.

Storage manager 150 identifies a machine learning task associated with the retrieved training dataset (step 204). In an embodiment, storage manager 150 identifies the machine learning task associated with retrieved training dataset 124 via associated training dataset metadata 126. Training dataset metadata 126 contains model information that includes intended machine learning tasks (e.g., intended outputs) and intended model structure subsequent to training with training dataset 124. In another embodiment, responsive to no identifiable machine learning task or an absence of training dataset metadata 126, storage manager 150 determines the machine learning task based on the data structure (e.g., rows and columns) associated with training dataset 124 and any missing values in training dataset 124. In this embodiment, storage manager 150 assigns a confidence probability to the determined machine learning task based on historical training datasets and historical machine learning tasks. In a further embodiment, storage manager 150 maintains a predetermined confidence threshold, where not meeting or exceeding the confidence threshold is indicative of an unidentifiable machine learning task.

Storage manager 150 chunks training dataset into data blocks (step 206). Storage manager 150 chunks training dataset 124 into a plurality of data blocks (i.e., data chunks or chunks of data), such as data blocks produced by different sensors. In an embodiment, storage manager 150 chunks training dataset 124 into a plurality of data blocking utilizing vertical chunking and/or horizontal chunking. In this embodiment, storage manager 150 utilizes training dataset metadata 126 to assist in the chunking process. For example, storage manager 150 utilizes column and row importance values to respectively apply horizontal chunking and vertical chunking to training dataset 124. In this example, storage manager 150 utilizes historical training with training dataset 124 to derive said importance values. In an embodiment, storage manager 150 applies horizontal chunking to training dataset 124 by segmenting, splitting, and/or partitioning training dataset 124 based on a plurality of rows contained in training dataset 124. In this embodiment, storage manager 150 utilizes training dataset metadata 126 and corresponding row importance values to create chunks with similar row importance. In another embodiment, storage manager 150 utilizes unsupervised clustering methods to generate row importance values. In an embodiment, storage manager 150 applies horizontal chunking to training dataset 124. In this embodiment, storage manager 150 chunks training dataset 124 based on columns (e.g., categories). Similar to vertical chunking, storage manager 150 utilizes column importance values stored in training dataset metadata 126. In yet another embodiment, storage manager 150 constructs a plurality of data blocks by segmenting the data records into discrete sections, subjects, or categorical sets. In various embodiments, storage manager 150 utilizes cross validation techniques, such as K-Fold cross validation, to create one or more testing and validation data blocks.

If storage manager 150 identifies a machine learning task, then storage manager 150 ("yes" branch, decision block 208), storage manager 150 computes information gain for each chunked data block in the retrieved data (step 210). In an embodiment, storage manager 150 identifies a plurality of features (i.e., predictions) contained in each data block through a feature identification process, such as a statistical-based feature selection method that evaluates the relationship between each input variable and the target variable (i.e., data records). In this embodiment, a prediction consists of a probability distribution over a set of labels in each class. In an embodiment, storage manager 150 utilizes featuring scaling techniques (e.g., rescaling, mean normalization, etc.) to normalize feature sets. Responsive to the feature identification, storage manager 150 calculates an information gain value for each data block. In an embodiment, storage manager 150 calculates entropy for each prediction associated with each data record in one or more data blocks. In this embodiment, storage manager 150 utilizes a reduction in entropy to calculate information gain of each feature and associated data record. Storage manager 150 aggregates all calculated information gain for each data record in a data block and calculates an average information gain for said block. In an embodiment, the higher the information gain for a data record, the higher effectiveness the data record or data block will have when training a model (e.g., neural network, decision tree, etc.). In an embodiment, storage manager 150 utilizes Kullback-Leibler (KL) divergence as a measure of information gain. In another embodiment, storage manager 150 utilizes cross-entropy to measure the relative entropy between probability distributions.

Storage manager 150 computes a heterogeneity of each data record in each chunked data block (step 212). Storage manager 150 computes a heterogeneity or a heterogeneity value (i.e., dissimilarity) for each data record in each data block in the retrieved training data (e.g., training dataset 124). In an embodiment, storage manager 150 calculates heterogeneity by computing a similarity between each data record in a data block. In this embodiment, storage manager 150 utilizes a consensus metric or proximity measure to calculate the similarity of each data record compared to every remaining data record. In an embodiment, storage manager 150 utilizes the Euclidean distance between two data records (i.e., data points). In another embodiment, storage manager 150 calculates similarity from the average cosine similarity between a pair of data records in a data block. Storage manager 150 aggregates all calculated similarity in a data block and calculates an average heterogeneity for said block by taking the inverse of the aggregated similarity (i.e., dissimilarity).

If storage manager 150 does not identify a machine learning task, then storage manager 150 ("no" branch, decision block 208), storage manager 150 computes noise of each data record in each chunked data block (step 214). Storage manager 150 computes a noise value for each chunked data block in training dataset 124, as described in step 206. In an embodiment, responsive to a structured data block, storage manager 150 utilizes data block metrics to detect and assign a noise value to the corresponding data block. In this embodiment, storage manager 150 computes an average distance of a comprised data record as compared to each remaining record in the parent data block. In another embodiment, storage manager 150 computes a homogeneity value for each data record as compared to each remaining data record, where the homogeneity values indicates variation in corresponding data record attribute values. In an embodiment, storage manager 150 utilizes the following equation to calculate the noise value:

$$\text{noisiness} = a_1 * \text{distance} + a_2 * \frac{1}{\text{homogeneity}},$$

$a_1$ and $a_2$ are weights empirically computed (e.g., unsupervised learning) or supplied to the storage manager 150.

In an embodiment, responsive to a textual data block, storage manager 150 identifies the number of noisy words in each data record in the parent data block. In this embodiment, noisy words includes spelling errors, abbreviations, out of vocabular words, etc.). In a further embodiment, storage manager 150 calculates a corresponding noise value by computing the proportion of noisy words to the total amount of words in the data block. In an embodiment, responsive to an image data block, storage manager 150 identifies the number of duplicate images in the data block as noise, where the duplicate images have divergent labels, and storage manager 150 identifies blurred images as noise. In this embodiment, storage manager 150 utilizes the proportion of noisy images to the total number of images as the noise value for the data block. In these embodiments, storage manager 150 aggregates a plurality of noise values associated with data records to calculate a noise value for each chunk data block in training dataset 124.

Storage manager 150 computes a usefulness score for each data block (step 216). In an embodiment, responsive to an identified machine learning task, storage manager 150 computes a usefulness score for each data block, where the usefulness score is a joint measure of information gain and heterogeneity as calculated in step 210 and 212. In this embodiment, a usefulness score is a numerical value (e.g., a value between 1-100), where a higher usefulness score signifies greater importance to the dataset and subsequently trained models. In an embodiment, responsive to an unidentified machine learning task, storage manager 150 utilizes the aggregated noise values, as described in step 214, as a usefulness score, where less noisy (i.e., lower noise value) data blocks are more useful than noisier (i.e., higher noise value). In these embodiments, a higher usefulness score signifies that the associated data block has a greater impact (e.g., larger impact on model prediction accuracy) on a trained model relative to other data blocks in a training dataset. Here, more useful data blocks are assigned and prioritized to storage that has high levels of performance and redundancy (e.g., RAID 10). For example, a data block with a calculated usefulness score of 92, based on the computed information gain and heterogeneity of comprised data records, is more useful than a data block with a calculated usefulness score of 32, based on computed noise values. In this example, the data block with the usefulness score of 92 has a greater impact on the accuracy and reliable of a model trained with said data block than the data block with the usefulness score of 32. In an embodiment, storage manager 150 defines usefulness as the product of information gain and heterogeneity of a data block. In an embodiment, storage manager 150 incorporates prediction accuracy as computed from a model trained with each data block in addition to calculated information gain and heterogeneity. In this embodiment, storage manager 150 utilizes model error rates as a modifier to a calculated usefulness score for a given data block. In another embodiment, storage manager 150 applies respective weights to information gain and heterogeneity values, allowing storage manager 150 to dynamically adjust the respective impact of information gain and heterogeneity values on subsequent usefulness scores as storage manager 150 trains models utilizing the data blocks and comprised data records. For example, storage manager 150 utilizes the following equation to calculate usefulness of a data block: usefulness=($b_1$*information gain)* ($b_2$*heterogeneity), $b_1$ and $b_2$ are weights or hyperparameters dynamically adjusted by storage manager 150 as storage manager 150 utilizes the data blocks to train models.

Storage manager 150 determines a storage strategy for each data block (step 218). In an embodiment, storage manager 150 determines a storage strategy (e.g., RAID strategy and/or suggested file system) for each data block responsive to a calculated usefulness for said data block. In an embodiment, storage manager 150 determines a RAID strategy for each data block in the training dataset. In this embodiment, the RAID strategy includes, but is not limited to, striping (e.g., RAID-0), mirroring (e.g., RAID-1), parity (e.g., RAID-5), and double parity. In a further embodiment, storage manager 150 combines multiple strategies for further data redundancy combined with data efficiency (e.g., RAID-10). In another embodiment, RAID strategies include alternative strategies such as zettabyte file system (ZFS). In an embodiment, storage manager 150 utilizes a series of usefulness thresholds and categories to determine which RAID strategy is most appropriate for a given data block. For example, responsive to a data block with a usefulness score exceeding a predetermined high usefulness threshold, storage manager 150 assigns a RAID strategy that includes a combination of striping, mirroring, and double parity. In this example, the assigned RAID strategy incorporates high data efficiency while maintaining high redundancy allowing rapid application into one or more models. In an additional embodiment, storage manager 150 sets usefulness thresholds controlling RAID strategies (i.e., combinations) for less useful data blocks such as striping, mirroring, and single parity; striping and single parity; only striping with no redundancy; no RAID strategy (i.e., one copy); etc. In another embodiment, storage manager 150 adjusts storage strategies based on changes in cloud infrastructure and conditions. For example, if hard drives are scarce, storage manager 150 adjusts existing distributed data blocks to provide parity and redundancy to more useful (i.e., higher usefulness score) blocks over less useful (i.e., lower usefulness score) data blocks. In this example, storage manager 150 removes parity from lower data blocks to satisfy parity requirements of more useful data blocks. In a further embodiment, storage manager 150 adjusts usefulness thresholds based on storage and network conditions. For example, storage manager 150 reduces usefulness thresholds when storage is readily accessible and cost efficient allowing more data blocks access to redundant and rapid storage (i.e., higher RAID strategy).

In another embodiment, storage manager 150 determines a filesystem to utilize with the RAID strategy based on respective calculated usefulness scores. In this embodiment, filesystems include, but are not limited to, File Allocation Table (FAT), NTFS (New Technology File System), ext4 journaling file system, etc. In this embodiment, storage manager 150 determines an appropriate filesystem based on available storage computing systems and the determined RAID strategy. In another embodiment, storage manager 150 incorporates data pricing into the storage strategy determination. In this embodiment, storage manager 150 modifies storage strategy determinations based on changes in data pricing associated with one or more storage strategies. For example, if cloud provider increases the price for parity RAID strategies, storage manager 150 modifies the storage strategy to incorporate cheaper strategies (e.g., removing striping, etc.) while maintaining efficiency and/or redundancy.

Responsive to a determined storage strategy, storage manager 150 distributes the data blocks according to the respective determined storage strategy. In a further embodiment, storage manager 150 initiates an application (e.g., training or retraining) of the distributed data blocks to one or more models. In another embodiment, storage manager 150 dynamically redetermines and redistributes one or more data blocks based on the inclusion of one or more data blocks into the training dataset.

Figure 3:
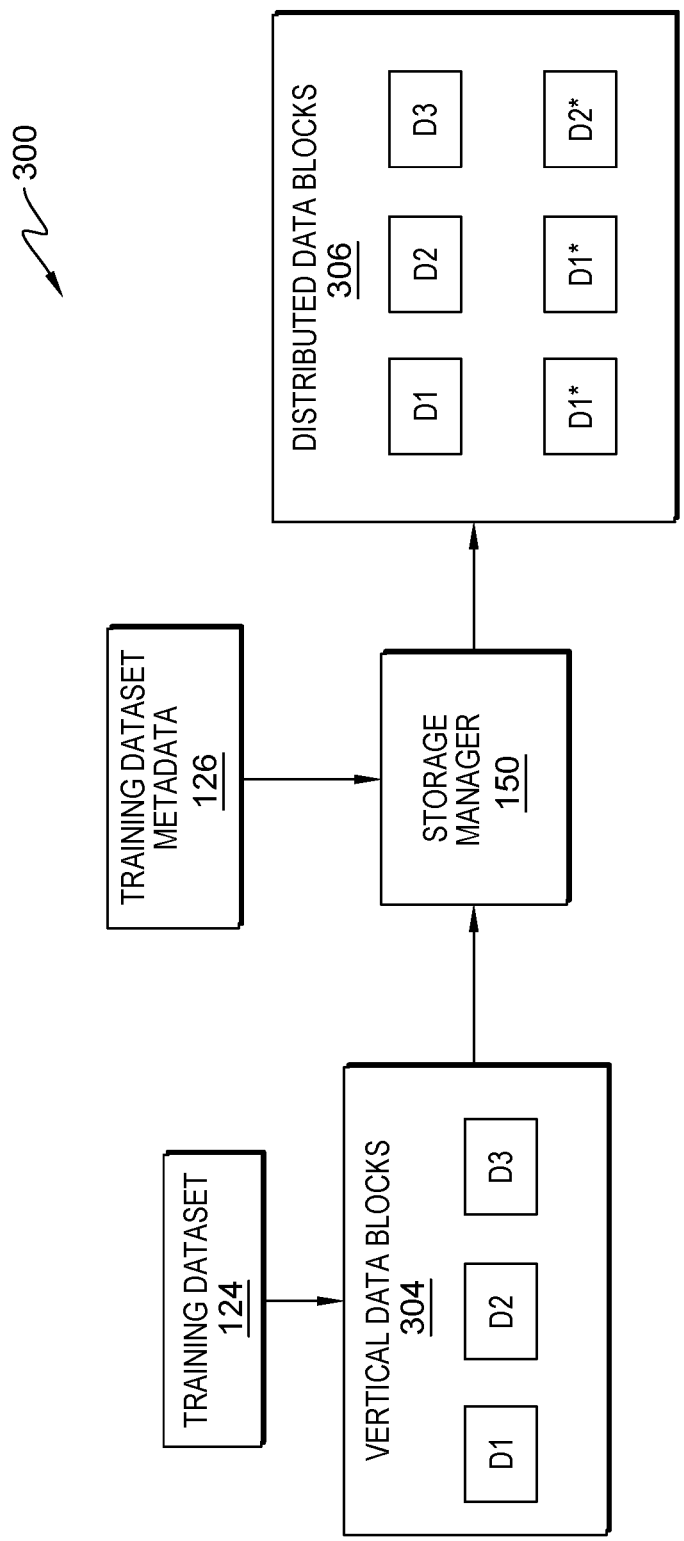
FIG. 3 illustrates vertical chunking operational steps of the program within the computational environment of FIG. 1, in accordance with an embodiment of the present invention.

FIG. 3 depicts illustration 300 demonstrating vertical chunking operational steps of storage manager 150. Illustration 300 demonstrates the vertical chunking of training dataset 124 into a plurality of vertical data blocks as depicted by vertical data blocks 304. Storage manager 150 utilizes vertical chunking to partition training dataset 124 based on comprised columns and associated data records. Storage manager 150 utilizes training dataset metadata 126 and corresponding row importance values to create vertical data blocks 304 containing data blocks D1, D2, and D3. Responsive to chunking, storage manager 150 calculates a corresponding usefulness score for each data block and determines a corresponding RAID strategy. Responsive to a determined RAID strategy, storage manager 150 distributes the data blocks as depicted by distributed data blocks 306. Distributed data blocks 306 contains data blocks D1, D2, and D3 with corresponding RAID strategies D1* and D2*. Here, D1 has a calculated high usefulness score, such that storage manager 150 assigns a double parity (i.e., D1*) RAID strategy for D1, where the double parity is distributed on different disks. Additionally, D2 has a usefulness score is less than D1 but still relatively high, thus storage manager 150 assigns a RAID strategy with only one parity (i.e., D2*). Lastly, D3 is not useful, thus storage manager 150 assigns a minimal RAID strategy with no parity.

Figure 4:
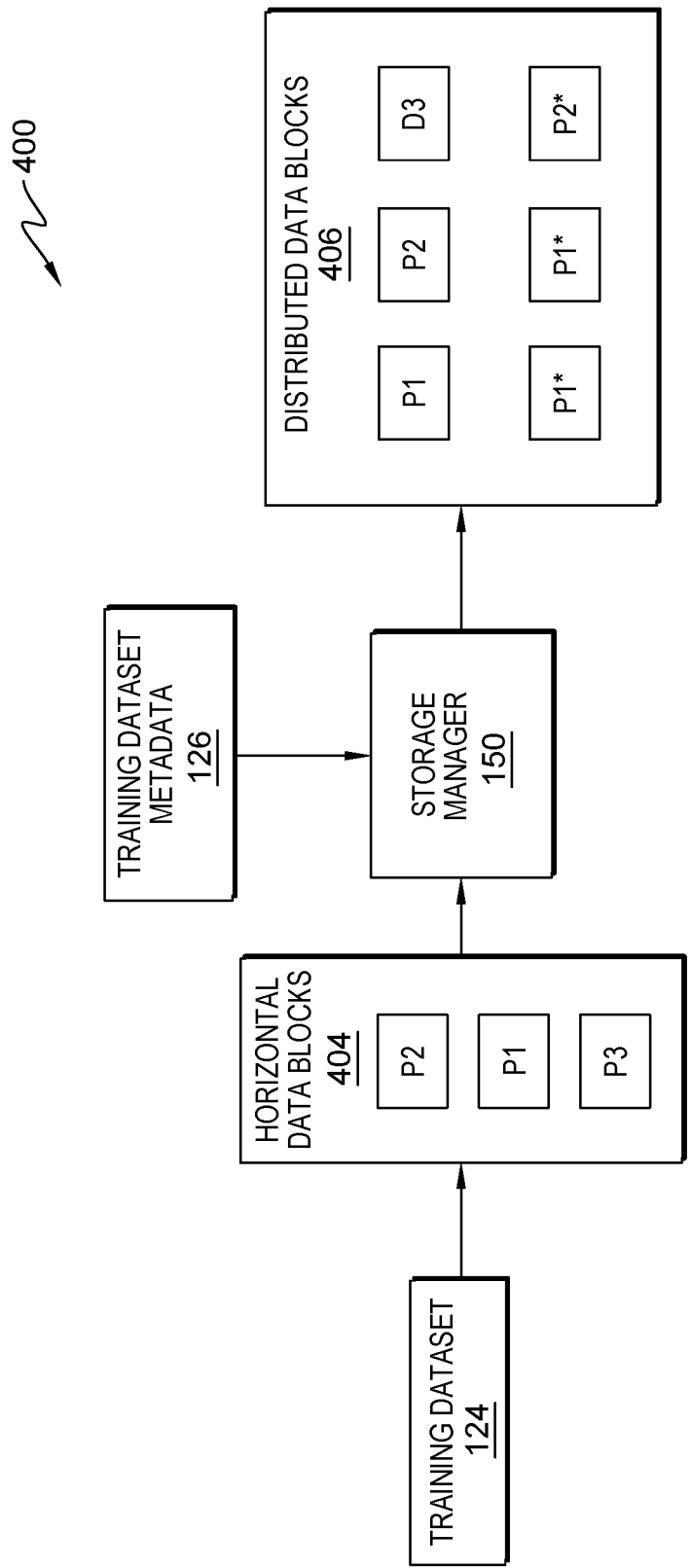
FIG. 4 illustrates horizontal chunking operational steps of the program within the computational environment of FIG. 1, in accordance with an embodiment of the present invention.

FIG. 4 depicts illustration 400 demonstrating vertical chunking operational steps of storage manager 150. Illustration 400 demonstrates the horizontal chunking of training dataset 124 into a plurality of vertical data blocks as depicted by horizontal data blocks 404. Storage manager 150 utilizes horizontal chunking to partition training dataset 124 based on comprised rows and associated data records. Storage manager 150 utilizes training dataset metadata 126 and corresponding row importance values to create horizontal data blocks 404 containing data blocks P1, P2, and P3. Responsive to chunking, storage manager 150 calculates a corresponding usefulness score for each data block and determines a corresponding RAID strategy. Responsive to a determined RAID strategy, storage manager 150 distributes the data blocks as depicted by distributed data blocks 406. Distributed data blocks 406 contains data blocks P1, P2, and P3 with corresponding RAID strategies P1* and P2*. Here, P1 has a calculated high usefulness score, such that storage manager 150 assigns a double parity (i.e., P1*) RAID strategy for P1, where the double parity is distributed on different disks. Additionally, P2 has a usefulness score is less than P1 but still relatively high, thus storage manager 150 assigns a RAID strategy with only one parity (i.e., P2*). Lastly, P3 is not useful, thus storage manager 150 assigns a minimal RAID strategy with no parity.

Figure 5:
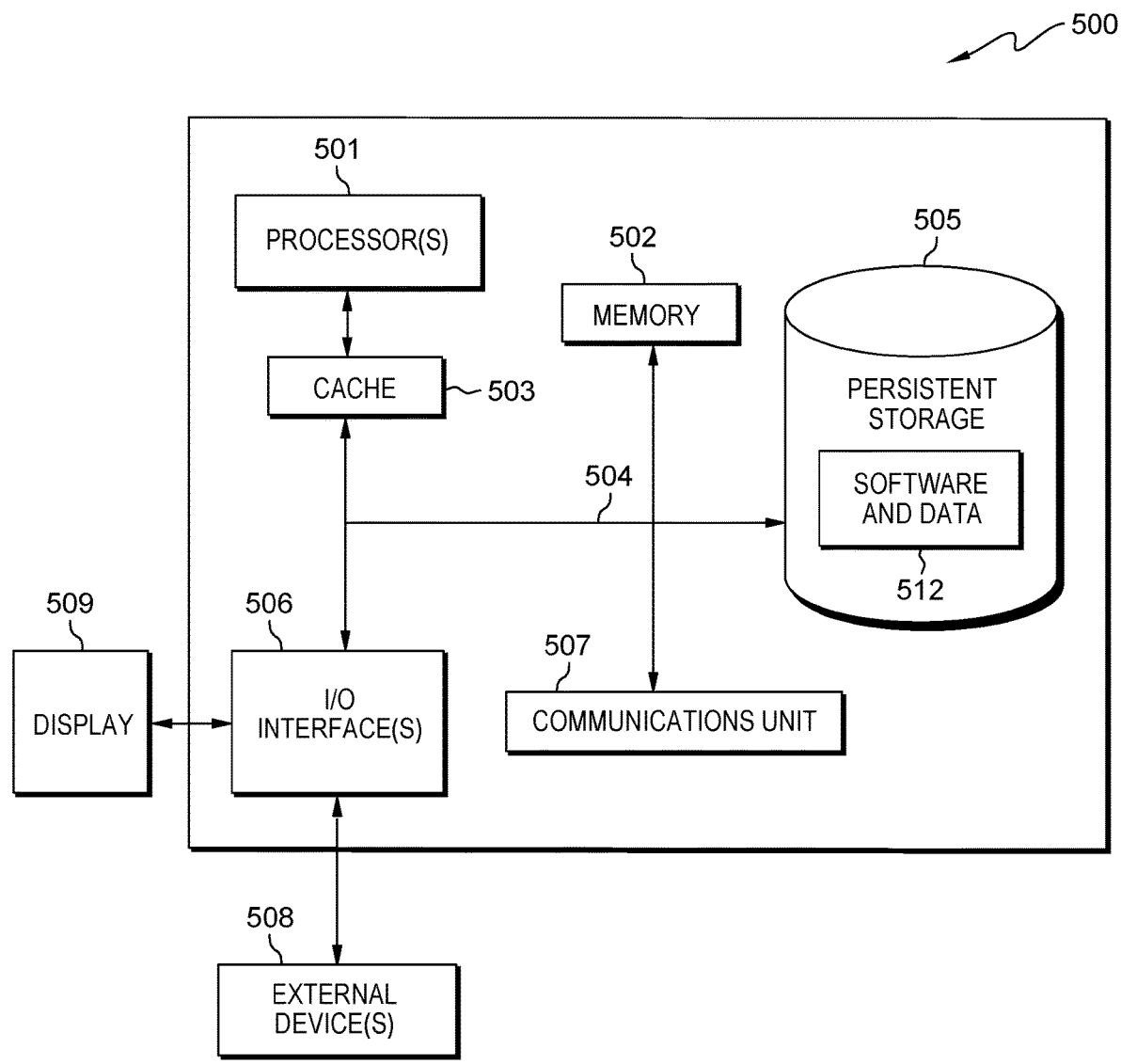
FIG. 5 is a block diagram of components of the server computer, in accordance with an embodiment of the present invention.

FIG. 5 depicts block diagram 500 illustrating components of server computer 120 in accordance with an illustrative embodiment of the present invention. It should be appreciated that FIG. 5 provides only an illustration of one implementation and does not imply any limitations with regard to the environments in which different embodiments may be implemented. Many modifications to the depicted environment may be made.

Server computer 120 each include communications fabric 504, which provides communications between cache 503, memory 502, persistent storage 505, communications unit 507, and input/output (I/O) interface(s) 506. Communications fabric 504 can be implemented with any architecture designed for passing data and/or control information between processors (such as microprocessors, communications, and network processors, etc.), system memory, peripheral devices, and any other hardware components within a system. For example, communications fabric 504 can be implemented with one or more buses or a crossbar switch.

Memory 502 and persistent storage 505 are computer readable storage media. In this embodiment, memory 502 includes random access memory (RAM). In general, memory 502 can include any suitable volatile or non-volatile computer readable storage media. Cache 503 is a fast memory that enhances the performance of computer processor(s) 501 by holding recently accessed data, and data near accessed data, from memory 502.

Storage manager 150 may be stored in persistent storage 505 and in memory 502 for execution by one or more of the respective computer processor(s) 501 via cache 503. In an embodiment, persistent storage 505 includes a magnetic hard disk drive. Alternatively, or in addition to a magnetic hard disk drive, persistent storage 505 can include a solid-state hard drive, a semiconductor storage device, a read-only memory (ROM), an erasable programmable read-only memory (EPROM), a flash memory, or any other computer readable storage media that is capable of storing program instructions or digital information.

The media used by persistent storage 505 may also be removable. For example, a removable hard drive may be used for persistent storage 505. Other examples include optical and magnetic disks, thumb drives, and smart cards that are inserted into a drive for transfer onto another computer readable storage medium that is also part of persistent storage 505. Software and data 512 can be stored in persistent storage 505 for access and/or execution by one or more of the respective processors 501 via cache 503.

Communications unit 507, in these examples, provides for communications with other data processing systems or devices. In these examples, communications unit 507 includes one or more network interface cards. Communications unit 507 may provide communications through the use of either or both physical and wireless communications links. Storage manager 150 may be downloaded to persistent storage 505 through communications unit 507.

I/O interface(s) 506 allows for input and output of data with other devices that may be connected to server computer 120. For example, I/O interface(s) 506 may provide a connection to external device(s) 508, such as a keyboard, a keypad, a touch screen, and/or some other suitable input device. External devices 508 can also include portable computer readable storage media such as, for example, thumb drives, portable optical or magnetic disks, and memory cards. Software and data used to practice embodiments of the present invention, e.g., storage manager 150, can be stored on such portable computer readable storage media and can be loaded onto persistent storage 505 via I/O interface(s) 506. I/O interface(s) 506 also connect to a display 509.

Display 509 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, conventional procedural programming languages, such as the "C" programming language or similar programming languages, and quantum programming languages such as the "Q" programming language, Q #, quantum computation language (QCL) or similar programming languages, low-level programming languages, such as the assembly language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method comprising:
    determining, by one or more computer processors, a storage strategy for each chunked data block in a training dataset based on a respective computed score and a series of score thresholds, wherein the storage strategy comprises RAID strategies that include striping, mirroring, parity, and double parity, wherein the computed score is computed by:
        responsive to an identified machine learning task associated with the training dataset, computing, by one or more computer processors, an aggregated information gain value and an aggregated heterogeneity value for each chunked data block;
        computing, by one or more computer processors, the score for each chunked data block based on a product of respective computed information gain values and respective computed heterogeneity values; and
    distributing, by one or more computer processors, each data block in the training dataset according to the respective determined storage strategy.

2. The computer-implemented method of claim 1, further comprising:
    chunking, by one or more computer processors, the training dataset into a plurality of data blocks utilizing horizontal chunking and vertical chunking.

3. The computer-implemented method of claim 2, further comprising:
    responsive to an unidentified machine learning task, computing, by one or more computer processors, the score for each data block in the plurality of data blocks based on aggregated noise values computed for each data record in a data block.

4. The computer-implemented method of claim 1, wherein computing the aggregated information gain value for each data block in the plurality of data blocks, comprises:
    computing, by one or more computer processors, an entropy value for each data record in a data block; and
    aggregating, by one or more computer processors, the computed entropy value for each data record in the data block.

5. The computer-implemented method of claim 1, wherein computing the aggregated heterogeneity value for each data block in the plurality of data blocks, comprises:
    computing, by one or more computer processors, a dissimilarity between each data record in a data block, wherein the dissimilarity is computed utilizing a consensus metric; and
    aggregating, by one or more computer processors, the computed dissimilarity for each data record in the data block.

6. The computer-implemented method of claim 1, wherein the storage strategy comprises a filesystem determination.

7. A computer program product comprising:
    one or more computer readable storage media and program instructions stored on the one or more computer readable storage media, the stored program instructions comprising:
    program instructions to determine, a storage strategy for each chunked data block in a training dataset based on a respective computed score and a series of score thresholds, wherein the storage strategy comprises RAID strategies that include striping, mirroring, parity, and double parity, wherein the computed score is computed by:
        program instructions to, responsive to an identified machine learning task associated with the training dataset, compute an aggregated information gain value and an aggregated heterogeneity value for each chunked data block;
        program instructions to compute the usefulness value for each chunked data block based on a product of respective computed information gain values and respective computed heterogeneity values; and
    program instructions to distribute each data block in the training dataset according to the respective determined storage strategy.

8. The computer program product of claim 7, wherein the program instructions, stored on the one or more computer readable storage media, further comprise:
    program instructions to chunk the training dataset into a plurality of data blocks utilizing horizontal chunking and vertical chunking.

9. The computer program product of claim 7, wherein the program instructions, to compute the aggregated information gain value for each data block in the plurality of data blocks, comprise:
    program instructions to compute an entropy value for each data record in a data block; and
    program instructions to aggregate the computed entropy value for each data record in the data block.

10. The computer program product of claim 7, wherein the program instructions, to compute the aggregated heterogeneity value for each data block in the plurality of data blocks, comprise:
    program instructions to compute a dissimilarity between each data record in a data block, wherein the dissimilarity is computed utilizing a consensus metric; and
    program instructions to aggregate the computed dissimilarity for each data record in the data block.

11. A computer system comprising:
    one or more computer processors;
    one or more computer readable storage media; and
    program instructions stored on the computer readable storage media for execution by at least one of the one or more processors, the stored program instructions comprising:
    program instructions to determine, a storage strategy for each chunked data block in a training dataset based on a respective computed score and a series of score thresholds, wherein the storage strategy comprises RAID strategies that include striping, mirroring, parity, and double parity, wherein the computed score is computed by:
        program instructions to, responsive to an identified machine learning task associated with the training dataset, compute an aggregated information gain value and an aggregated heterogeneity value for each chunked data block;

program instructions to compute the usefulness value for each chunked data block based on a product of respective computed information gain values and respective computed heterogeneity values; and program instructions to distribute each data block in the training dataset according to the respective determined storage strategy.

12. The computer system of claim 11, wherein the program instructions stored, on the one or more computer readable storage media, further comprise:

program instructions to create chunk the training dataset into a plurality of data blocks utilizing horizontal chunking and vertical chunking.

13. The computer system of claim 11, wherein the program instructions, to compute the aggregated information gain value for each data block in the plurality of data blocks, comprise:

program instructions to compute an entropy value for each data record in a data block; and program instructions to aggregate the computed entropy value for each data record in the data block.

14. The computer system of claim 11, wherein the program instructions, to compute the aggregated heterogeneity value for each data block in the plurality of data blocks, comprise:

program instructions to compute a dissimilarity between each data record in a data block, wherein the dissimilarity is computed utilizing a consensus metric; and program instructions to aggregate the computed dissimilarity for each data record in the data block.

* * * * *